United States Patent [19]
Jaklin

[11] 3,950,178
[45] Apr. 13, 1976

[54] CONCRETE CONTAINING SPARINGLY SOLUBLE BARIUM COMPOUNDS

[76] Inventor: Hans Jaklin, Devorastr. 4, 55 Trier, Germany

[22] Filed: Sept. 23, 1974

[21] Appl. No.: 508,372

[30] Foreign Application Priority Data
Sept. 25, 1973 Germany............................ 2348081

[52] U.S. Cl. ...................... 106/89; 106/90; 106/97; 106/98; 106/314
[51] Int. Cl.² ........................................... C04B 7/02
[58] Field of Search ............ 106/89, 90, 97, 98, 314

[56] References Cited
UNITED STATES PATENTS

| | | | |
|---|---|---|---|
| 3,188,222 | 6/1965 | Harris | 106/89 |
| 3,645,763 | 2/1972 | Ronzio et al. | 106/314 |

*Primary Examiner*—J. Poer
*Attorney, Agent, or Firm*—Burgess, Dinklage & Sprung

[57] ABSTRACT

In a concrete or mortar composition comprising cement or mortar, calcium sulfate and water, the improvement which comprises at least about 0.5% by weight of the cement or mortar of at least one sparingly soluble barium compound having a solubility product between $6.1 \times 10^{-5}$ and $1.08 \times 10^{-10}$, e.g., barium oxalate, barium fluoride and/or barium silicate hydrate having a $BaO:SiO_2$ mole ratio of about 0.5 to 1.2.

5 Claims, No Drawings

CONCRETE CONTAINING SPARINGLY SOLUBLE BARIUM COMPOUNDS

This application relates to concrete of improved resistance to corrosive liquids.

Concrete is one of the few building materials which so far has well withstood weathering and other harmful environmental influences even without protective coatings. However, the demands made on building materials are constantly rising due to the steadily advancing technology and and civilization, and the causes and possibilities for damage are constantly increasing due to environmental stress. Acid containing solutions, particularly concentrated brines containing sulfates, are extremely harmful to cement. The alkaline cement is directly attacked and compounds are formed with the sulfate ions in the concrete which occupy a larger volume than the starting materials. Sulfate blowing is a very dreaded damage, caused by sulfate-containing waters or solutions and is based on the formation of ettringite, $3\ CaO \cdot Al_2O_3 \cdot 3\ CaSO_4 \cdot 32\ H_2O$ or the monosulfate $3\ CaO \cdot Al_2O_3 \cdot CaSo_4 \cdot 18\ H_2O$. Approximately 46% by weight of ettringite is water.

By using special cements, e.g., with a maximum of 3% of $C_3A$ and a maximum of 5% of $Al_2O_3$, the resistance to sulfates of concrete of blast furnace cements with at least 70% foundry sand can be increased but for this other disadvantages must be accepted. Moreover, the $C_3A$ - poor cements are also not completely resistant. Ettringite, however, as investigations have proven, can even form from hydrated $C_4AF$.

The scope of variation of the cement composition, as referred to the most important phases $C_3S$, $C_2S$, $C_3A$, $C_4AF$, $C_2F$, is, however, narrowed by the laws of cement technology. Therefore, industry has little latitude for changing the properties of cement by way of working with heat, other raw materials and additions, for the concrete mixture and the finished concrete must meet all requirements set forth in the codes, e.g., DIN.

Furthermore, the cement production must be economical. Special cements are more expensive to make due to the generally smaller amounts required than the normal cement types. Thus, the barium cement made of barium-clinker, described by BRANISKI in Zement-Kalk-Gips (Cement-Lime-Gypsum), 10 (1957), P. 176–184, has not achieved any importance, even though a high resistance towards seawater was detected in this cement.

A particularly important characteristic of the concrete mixing is the correct hardening and setting in time periods useful for working up. The hardening is decisively influenced by the content of $C_3A$ and the plaster- and/or anhydrite added during the grinding in of clinker as a setting regulator. An addition of a few per cent of gypsum or anhydrite slows down the hardening of the concrete. The clinker composition, in particular the $C_3A$-content of the clinker, is definitive for the gypsum addition. The amount of gypsum may not go beyond a certain limit lest excessive ettringite-formation sets in. Most cement works add in the maximum possible amount of gypsum as it usually increases the durability.

The content of $SO_3$, which results from impurities in the raw materials (0.1 to 1.5%) and gypsum addition, may lie between 1.5 and 4%. The maximum value is limited to 4.5% according to DIN. Only a short period of time after the mixing water is added to the cement, e.g., 30 seconds, the reaction of plaster and $C_3A$ to form the monosulfate at a low content of the gypsum component or to form ettringite at a higher $SO_4$-ion concentration can be demonstrated.

The ettringite cover formed around the $C_3A$-clinker material, which develops after only a few minutes, prevents water from getting to the core and retards the hydration of the $C_3A$. As cement research has shown, the spontaneous formation of the ettringite is, therefore, the reason for the standard hardening and setting of the concrete mixture. German published specification DOS No. 2,108,856 proposed to avoid damages due to sulfate blowing and sulfate blistering on existing buildings by applying a slurry of barium oxide and cement onto the masonry. The idea of this publication was to transform the soluble sulfates present in the masonry by reaction with the barium hydroxide present in the slurry to form practically insoluble barium sulfate. In order satisfactorily to prevent the development of soluble alkali compounds, the barium oxide must be roasted, i.e., must be carbonate-free.

If one tries to transfer this teaching to the production of concrete mixtures, it becomes evident that the sulfate contained in the cement reacts immediately with the barium oxide, as soon as the mixing water is added. The good solubility of the calcium sulfate leads to sulfate concentrations in the mixing water of above 1.1 g/l. In a system which aside from other ions also contains barium and sulfate ions, barium sulfate will always precipitate as a solid body as it has the least solubility of all known barium compounds, so that for stoichiometric concentrations only 1.37 mg Ba/l and 0.96 mg $SO_4$/l can remain in the solution. The added barium oxide, which is present in the mixing water as barium hydroxide, thus binds a corresponding stoichiometric amount of sulfate ions and thus influences the setting behavior of concrete or concreteor mortar mixture. Besides, practically no barium is any longer available for the sulfate binding in the masonry or in the water which attacks the finished concrete or plaster, as it was already bound by the sulfate of the Portland cement. Thus it seemed that the problem of improving the resistance of concrete toward sulfate-containing waters could not be solved by adding barium compounds to the concrete mixture.

It is accordingly an object of the invention to improve the resistance of concrete to attack by corrosive liquids.

This and other objects are realized in accordance with the present invention pursuant to which sparingly soluble barium compounds are added to compositions comprising cement or mortar, calcium sulfate and water, the barium compounds being unable to react with the calcium sulfate setting regulator during the normal setting of the concrete. In the finished concrete the sulfate to a large extent is bound up as ettringite, so-called trisulfate, or also as monosulfate, which no longer uses up barium compounds in forming barium sulfate.

Sparingly soluble barium compounds in accordance with the invention include barium oxalate, barium fluoride and/or barium silicate hydrate having a $BaO:SiO_2$ mole ratio of about 0.5 to 1.2, the barium compound being added in at least about 0.5% by weight of the cement.

In addition to sparingly soluble individual barium compounds, mixtures thereof can also be used. The solubility product of the barium compounds to be used according to the invention should be smaller than that of calcium sulfate ($L_{18} = 6.1 \times 10^{-5}$) and larger than that of barium sulfate ($L_{18} = 1.08 \times 10^{-10}$).

The amount of the sparingly soluble barium compound to be added is at least about 0.5% by weight of the cement portion. The preferred range is about 1.5 to 4% by weight. Amounts above about 8% produce no further improvement of the desired effect.

The expression "concrete- or mortar mixtures", to which the sparingly soluble barium compounds are added in the recited amounts, is to be interpreted in the widest sense and includes estrich mortar, wall mortar, plaster mortar, packing mortar and others made from cement, sand, gravel, trass, expanded clay, foam lava, pumice, foamed polystyrene, cork, polyurethane foams and other inorganic or organic admixtures or additions and hydraulically hardening mixtures produced through addition of water. Concrete mixtures and mortar mixtures according to the invention furthermore may contain the most diverse concrete admixtures and mortar admixtures, as described in the book "Zusatzmittel, Anstrichstoffe, Hilfsstoffe für Beton und Mörtel" (Admixtures, Coating Materials, Auxiliary Materials for Concrete and Mortar) by Albrecht and Mannherz, Bauverlag GmbH., 1968. When, as above, cement is named as a constituent of concrete- and mortar mixtures, there is preferably intended Portland cements, iron Portland cements, blast furnace cements and trass cements (Puzzolan cements), to which also raw meal or fly ash can be admixed.

The concrete- or mortar admixtures according to the invention in the form of sparingly soluble barium compounds can be worked into the concrete- or mortar mixtures without difficulty or additional mixing time. They work counter to the separation process. The number of blows to the beginning of separation was increased by 20% in the case of concretes mixed with barium fluoride, oxalate or silicate hydrate. The hardening times are hardly changed. A delay of 30 minutes results with quickly setting cements, and a delay of about 20 minutes with slowly setting cements. This slight delay proves that the sparingly soluble barium compounds influence the hardening process only insignificantly. The constancy of volume according to DIN 1164 is in all cases positive. The compression strength values were on the average about 12% and the vertex breaking load values about 20% higher than those of the comparison tests. The depth of water penetration was reduced from 18 mm to 2 mm and the water absorption was reduced from 6.7% to 2%. It was particularly surprising that concrete made with the sparingly soluble barium compounds becomes more resistant not only to sulfate but also to other concrete-attacking media, as is evident in detail from the following table. Through the better workability mentioned, a higher concrete density, in particular a better concreteembedding of steel reinforcements is produced as confirmed by tests on steel-reinforced concretes. Thus, the concrete- or mortar admixtures to be used according to the invention combine an improvement of all important characteristics of the fresh and hardened concrete with a good corrosion protection for steel reinforcements and a high resistance to corrosive solutions and substances.

For the resistance to corrosive solutions, 28 day old testing forms of concrete of an absolute weight between 467 and 472 g were cut and placed into the stated solutions. The solutions were replaced twice a week, the testing forms were observed and checked in these solutions up to the 56th day, and damages were determined by weight control and visual examinations for formation of cracks.

| No. | Corrosive solution | Admixture | % Loss of Weight With Admixture | Without admixture (Comparison) |
|---|---|---|---|---|
| 1 | 5% $H_2SO_4$ | 1.5% BSH* | 0.63 | 1.43 |
| 2 | " | 3.0% BSH* | 0.55 | 2.23 |
| 3 | " | 6.0% BSH* | 0.12 | 1.86 |
| 4 | " | 2.0% $BaC_2O_4$ | 0.50 | 1.84 |
| 5 | $H_2CO_3$ saturated | 2.0% BSH* | 0.12 | 0.47 |
| 6 | NaCl | 2.0% $BaF_2$ | 0.23 | 0.61 |

*Barium silicate hydrate, $BaO:SiO_2$ mole ratio of 1

The samples in sulfuric acid, which did not contain an addition of barium compounds, showed fine cracks after deposit of 35 to 40 days, which became wider up to the 56th day. The concrete samples made with barium silicate hydrate or $BaC_2O_4$ were free of cracks even after 56 days.

The concrete forms used in the test were made according to the German standard DIN 1164 by mixing
900 parts by weight of coarse standard sand,
450 parts by weight of fine standard sand,
450 parts by weight of Portland cement PZ 350° F,
270 parts by weight of water,
plus the indicated amount of admixture based on the weight of Portland cement.

The abbreviations for the clinker phases used in this specification have the following meaning:
$C_3A$ — tricalciumaluminate,
$C_3S$ — tricalciumsilicate,
$C_2S$ — dicalciumsilicate,
$C_2F$ — dicalciumferrite,
$C_4AF$ — tetracalciumaluminateferrite It will be appreciated that the instant specification and examples are set forth by way of illustration and not limitation, and that various modifications and changes may by made without departing from the spirit and scope of the present invention.

What is claimed is:

1. In a concrete composition comprising cement, calcium sulfate and water, the improvement which comprises including at least about 0.5% by weight of the cement of at least one spraingly soluble barium compound selected from the group consisting of barium oxalate, barium fluoride and barium silicate hydrate.

2. The composition according to claim 1, wherein the sparingly soluble barium compound is present in about 1.5 to 4% by weight.

3. The composition according to claim 1, wherein the barium compound is barium oxalate.

4. The composition of claim 1, wherein the barium compound is barium fluoride.

5. The composition of claim 1, wherein the barium compound is barium silicate hydrate having a $BaO:SiO_2$ mole ratio of about 0.5 to 1.2.

* * * * *